US012736363B2

(12) United States Patent
Tripathy

(10) Patent No.: US 12,736,363 B2
(45) Date of Patent: Sep. 15, 2026

(54) SYSTEMS AND METHODS FOR PRESERVING ROUTE INSTRUCTION INFORMATION

(71) Applicant: Transportation IP Holdings, LLC, Norwalk, CT (US)

(72) Inventor: Janmejay Tripathy, Cedar Rapids, IA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 512 days.

(21) Appl. No.: 18/311,628

(22) Filed: May 3, 2023

(65) Prior Publication Data

US 2023/0273035 A1 Aug. 31, 2023

Related U.S. Application Data

(63) Continuation-in-part of application No. 16/741,334, filed on Jan. 13, 2020, now Pat. No. 11,675,368.

(51) Int. Cl.

*G01C 21/36* (2006.01)
*B60W 50/12* (2012.01)
*G01C 21/34* (2006.01)
*G07C 5/00* (2006.01)

(52) U.S. Cl.

CPC ......... *G01C 21/3617* (2013.01); *B60W 50/12* (2013.01); *G01C 21/3492* (2013.01); *G07C 5/008* (2013.01)

(58) Field of Classification Search

CPC ...................... G01C 21/3492; G01C 21/3617; B60W 50/12

See application file for complete search history.

(56) References Cited

U.S. PATENT DOCUMENTS 11,675,368 B2 6/2023 Tripathy
2013/0197719 A1* 8/2013 Nagasawa ............ G05D 1/0027 701/2
2018/0196426 A1* 7/2018 Kim ........................ B61L 27/57
2020/0257559 A1 8/2020 Suvitie

* cited by examiner

*Primary Examiner* — Aaron L Troost
(74) *Attorney, Agent, or Firm* — K&L Gates LLP

(57) ABSTRACT

A system may include one or more processors disposed onboard a vehicle. When in an active state of the vehicle in which the system may receive instructions from an off-board system, the processors may receive enforcement targets from an off-board source. The enforcement targets may be associated with corresponding portions of a route and may have corresponding associated enforcement activities to be performed based on location of the vehicle relative to the corresponding portions of the route. The processors may store at least some of the received enforcement targets onboard the vehicle as preserved targets having corresponding preserved enforcement activities responsive to a transition from the active state to a degraded state of the vehicle in which two or more enforcement targets are no longer received. The processors may perform the preserved enforcement activities associated with the preserved targets.

19 Claims, 4 Drawing Sheets

SYSTEMS AND METHODS FOR PRESERVING ROUTE INSTRUCTION INFORMATION

CROSS-REFERENCE TO RELATED APPLICATIONS

This application is a continuation-in-part of U.S. application Ser. No. 16/741,334, which was filed on Jan. 13, 2020, the entire disclosure of which is incorporated herein by reference.

BACKGROUND

Technical Field

The subject matter described relates to systems and methods that control movements of vehicles.

Discussion of Art

Certain vehicles travel along routes and receive control messages or commands from off-board sources. However, during operation, a vehicle may lose contact with a source of control messages or commands or may enter a degraded state where the control messages or commands are no longer received. Accordingly, the vehicle may lose the benefit of the information from the off-board source.

It may be desirable to have a system and method that differs from those that are currently available.

BRIEF DESCRIPTION

In one embodiment, a system may include one or more processors disposed onboard a vehicle. When in an active state of the vehicle in which the system may receive instructions from an off-board system, the processors may receive enforcement targets from an off-board source. The enforcement targets may be associated with corresponding portions of a route and may have corresponding associated enforcement activities to be performed based on location of the vehicle relative to the corresponding portions of the route. The processors may store at least some of the received enforcement targets onboard the vehicle as preserved targets having corresponding preserved enforcement activities responsive to a transition from the active state to a degraded state of the vehicle in which two or more enforcement targets are no longer received. The processors may perform the preserved enforcement activities associated with the preserved targets.

In one embodiment, a system may include one or more processors disposed onboard a vehicle. The one or more processors may receive, while in an active state of the vehicle in which the system receives instructions from an off-board system, enforcement targets from an off-board source. The enforcement targets may be associated with corresponding portions of a route to be traversed by the vehicle and may have corresponding associated enforcement activities to be performed based on location of the vehicle relative to the corresponding portions of the route. The processors may store at least some of the received enforcement targets onboard the vehicle as preserved targets having corresponding preserved enforcement activities responsive to a transition from the active state to a degraded state of the vehicle in which two or more enforcement targets are no longer received. The preserved enforcement activities may include one or more of slowing movement of the vehicle to comply with a speed limit of the route, informing the off-board source of which of the received enforcement targets were stored as the preserved enforcement activities, or continuing performance of a current enforcement target of the received enforcement target that was being performed as the vehicle transitioned from the active state to the degraded state. The processors may provide a prompt to the off-board source responsive to the transition from the active state to the degraded state.

In one embodiment, a method includes receiving, when in an active state of a vehicle in which the vehicle receives instructions from an off-board system, enforcement targets from an off-board source. The enforcement targets are associated with corresponding portions of a route to be traversed by the vehicle and have corresponding associated enforcement activities to be performed based on location of the vehicle relative to the corresponding portions of the route. The method also includes storing at least some of the received enforcement targets onboard the vehicle as preserved targets having corresponding preserved enforcement activities, responsive to a transition from the active state to a degraded state of the vehicle in which the enforcement targets are not received. Further, the method includes performing the preserved enforcement activities associated with the preserved targets.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to systems and methods for vehicles that receive targets or other instructions from an off-board system, with the targets corresponding to limits or requirements on vehicle control through a portion of a route. In some circumstances, vehicles may transition to a degraded state in which they stop receiving the targets. Various embodiments disclosed herein notify a dispatcher and/or an operator of a vehicle about an active targets list from an off-board source that were present when the vehicle transitions from an active state to a degraded state in which targets are no longer received from the off-board source. In one example, an artificial intelligence (AI) or machine learning system may analyze portions of the route where the vehicles may transition to the degraded state and may preserve the received targets list in advance of the transition to the degraded state. Further, embodiments preserve the received targets list and provide an interface with the crew to account for the actions and/or implement actions autonomously.

In some embodiments, a system provides guidance to a vehicle crew by displaying a degraded system warning prompt along with target details (of targets that had been received before the transition to the degraded state) for the crew to review. Additionally or alternatively, a list of active targets received may be sent to a dispatcher and/or other off-board system to inform the recipient of which targets have been received and which have not.

It may be noted that while example embodiments may be discussed in connection with rail vehicle systems, not all embodiments described herein are limited to rail vehicle systems and/or positive train control systems. For example, one or more embodiments of the systems and methods described herein can be used in connection with other types of vehicles receiving power as they travel along a route, such as automobiles, trucks, buses, mining vehicles, marine vessels, agricultural vehicles, other off-highway vehicles, or the like. Further, while various examples may be utilized in connection with a positive control system (e.g., a system in which a vehicle is not allowed to enter a route segment unless a signal is received that gives permission), it may be noted that other embodiments may be utilized in connection with negative control systems (e.g., a system in which a vehicle is allowed to enter any route segment unless a signal is received denying permission) and/or other types of control systems.

Figures 1, 2:
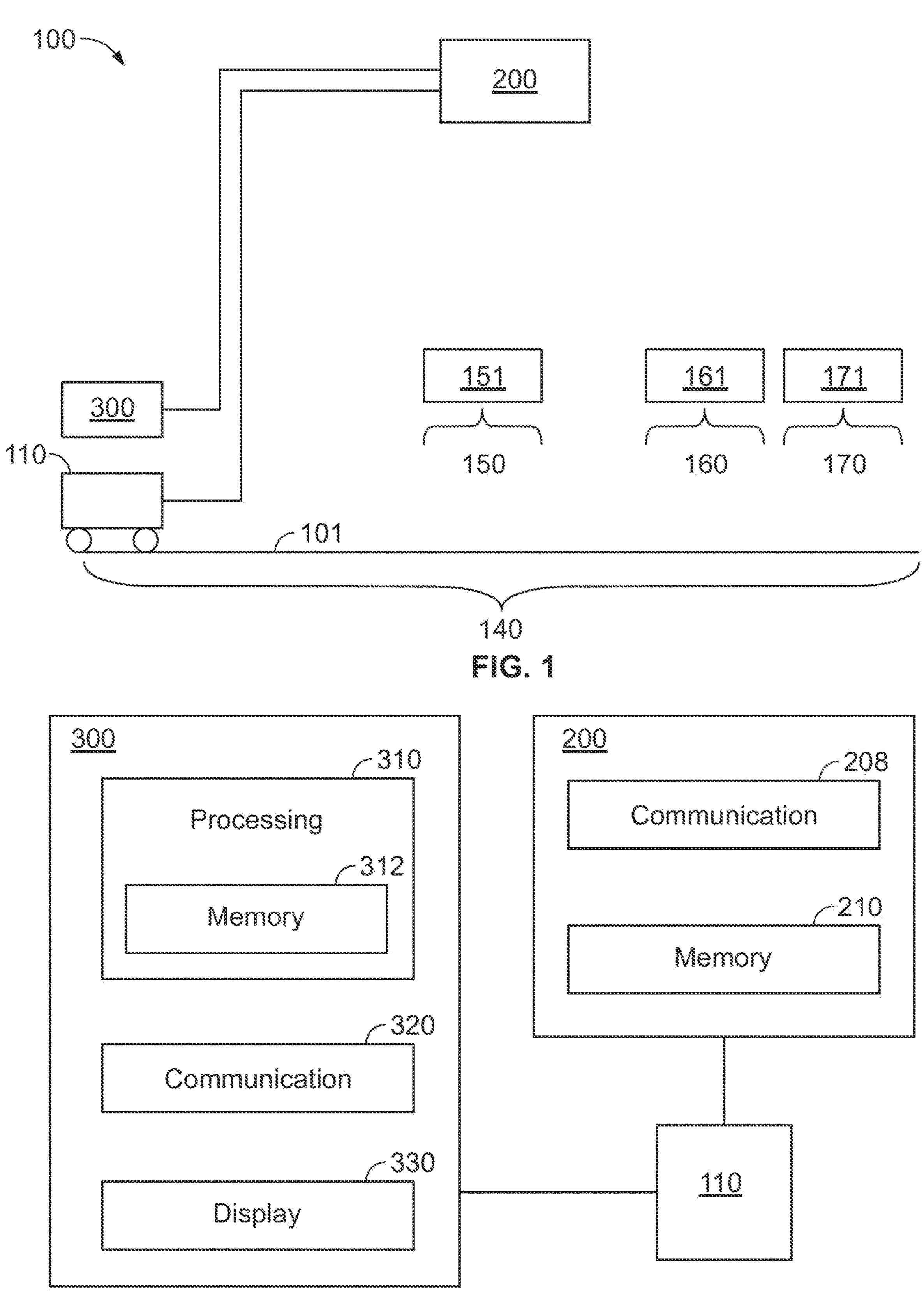
FIG. 1 illustrates one example of a network including a vehicle that receives instructions from an off-board system.
FIG. 2 provides a schematic block diagram of example aspects of the network of FIG. 1.

FIG. 1 illustrates an example network 100 that may include a vehicle 110, an off-board control system 200, and a target preservation system 300. The vehicle may traverse routes 101 of the network, with the route (or a portion thereof) associated with or administered by the off-board control system. The off-board control system may provide instructions to the target preservation system, and the target preservation system may control the vehicle pursuant to the instructions. The off-board control system may be an example of an off-board system from which the target preservation system receives instructions (e.g., instructions for controlling the vehicle). The instructions from the off-board control system may include enforcement targets. The enforcement targets may be associated with corresponding portions of the route traversed by the vehicle, and have corresponding associated enforcement activities to be performed based on the location of the vehicle relative to the corresponding portions of the route (e.g., how close the vehicle is relative to a corresponding route portion, whether the vehicle is inside the corresponding route portion, whether the vehicle is outside the corresponding route portion). For example, in the illustrated embodiment, the route may include a first portion 150, a second portion 160, and a third portion 170. The various portions may be part of a territory 140 administered by the off-board control system. A first target 151 may be associated with the first portion, a second target 161 may be associated with the second portion, and a third target 171 may be associated with the third portion. The targets and instructions may be provided to the target preservation system and/or vehicle on an ongoing, periodic, or repeated basis, and/or may be based on vehicle position (e.g., targets provided responsive to the vehicle entering a territory governed by the off-board control system). A single vehicle may be shown traversing a single route of the network in FIG. 1 for ease and clarity of illustration, however multiple vehicles may traverse multiple routes of the network.

The off-board control system may be located off-board the vehicle and may provide information and/or commands to the vehicle (e.g., to target preservation system disposed on board the vehicle in the illustrated example). The off-board control system may also provide information and/or commands to other vehicles traversing various routes of the network. The off-board control system may store and/or analyze the communications to other vehicles traversing various routes of the network. The off-board control system may be able to determine, based on this analysis, where along the various routes degraded communication zones may occur. The target preservation system may help control the vehicle based on the instructions or commands received from the off-board control system. It may be noted that the target preservation system may be disposed on-board the vehicle in an illustrated example (see FIG. 3 and related discussion), but all or a portion of the target preservation system may be disposed off-board of the vehicle and communicate (e.g., via wireless communication) with the vehicle.

Generally, as used herein, an enforcement target may be understood as an instruction or limitation regarding operation of the vehicle in a corresponding portion of the route. The enforcement target may include a direction to an operator and/or an interventional activity autonomously performed. For example, if an enforcement target is critical enough or relates to a sufficient risk where there may not be sufficient time for operator recognition or implementation, an enforcement target may include a control or command that is autonomously performed. Further, an enforcement target may over-ride an attempted action by an operator. As another example, an enforcement target may include both instruction and intervention. For instance, an enforcement target may include a speed limit for which an operator is notified. However, if the operator fails to follow the instruction (e.g., exceeds the speed limit by a predetermined amount and/or exceeds the speed limit for a predetermined amount of time), the enforcement target may be autonomously implemented to control the vehicle to slow to the speed limit. In various embodiments, examples of enforcement targets may include one or more of a speed limit for a particular portion of a route, a direction to follow a signal (e.g., electronic or visual signal) located or received at an upcoming portion of a route, an instruction related to a movement authority (e.g., position of a switch), an instruction to stop and wait for another vehicle to vacate an upcoming portion of route, a crossing obstruction or other obstruction in an upcoming portion of a route, an instruction regarding a work zone (e.g., stop or slow down in portions of a work zone), or instructions regarding a grade crossing (e.g. stop or slow down before approaching a grade crossing).

When the vehicle may be functioning properly and in an active state, the vehicle may be capable of receiving instructions, and/or may receive instructions from the off-board system. Accordingly, in the active state, the vehicle (e.g., target preservation system disposed on-board the vehicle and/or one or more other systems disposed on the vehicle) may receive enforcement targets from the off-board control system. However, it may be noted that the vehicle during operation may transition from the active state to a degraded state. In the degraded state, the vehicle may not receive the enforcement targets.

In various examples, degraded states may include a disengaged state (e.g., a degraded state entered due to a non-synchronized subdivision, unknown or invalid location signal, or invalid speed), and a cutout or failed state (e.g., a degraded state entered due to a fault detection or a system cutout). Examples of causes of degradation or transition to the degraded state include detection of a fault, crew action, office cutout, loading of a new configuration, a non-synchronized subdivision, and unknown or improper global positioning system (GPS) signals. For example, the vehicle may transition to the degraded state due to a failure of one or more communication components that communicably couple the vehicle to the off-board control system. As another example, a GPS receiver disposed on-board the vehicle may fail, causing the off-board control system to not have information on the location of the vehicle.

When the vehicle may be in the degraded state, instructions or messages including enforcement targets may no longer be received by the vehicle. Conventionally, transition to the degraded state may have caused loss of enforcement targets, as they may no longer be received or processed by the vehicle. However, in the illustrated embodiment, as discussed herein, the target preservation system may preserve and implement enforcement targets that were previously received before a transition from the active state to the degraded state. In one example, the target preservation system may use an AI or machine learning system to determine when to preserve and implement enforcement targets that were previously received before a transition from the active state to the degraded state. Accordingly, various embodiments may improve the safety, reliability, and efficiency of the operation of the vehicle by implementing enforcement targets that otherwise would have been lost.

FIG. 2 may provide a schematic block diagram of aspects of the network according to various embodiments. As seen in FIG. 2, the depicted target preservation system may include a processing unit 310, a communication unit 320, and a display 330. It may be noted that in various examples the target preservation system (or a portion thereof) may be disposed on the vehicle, and one or more aspects of the target preservation system (e.g., communication unit, display) may be shared with one or more other systems of the vehicle. Generally, the target preservation system may determine when the vehicle transitions from the active state to the degraded state, and may preserve received enforcement targets responsive to the transition from the active state to the degraded state. For example, the target preservation system may receive one or more signals indicating a transition from the active state to the degraded state. For example, a signal may be received from a sensor detecting a fault that causes a transition to the degraded state. As another example, the target preservation system may determine when the vehicle transitions from the active state to the degraded state based on a predetermined number of signals that are not received. The predetermined number of signals may be two signals that are not received (e.g., two consecutive signals), or the predetermined number of signals may be one signal or two or more signals. As another example, a signal may be received responsive to a crew or office input corresponding to a transition to the degraded state. The crew or office input may indicate an upcoming portion of the route that may result in a degraded state.

In the example embodiment, the target preservation system may communicate with the off-board control system. The off-board control system in various embodiments may be referred to as a vehicle management control system or an off-board control system. The off-board control system can represent hardware circuitry that includes and/or is connected with one or more processors that perform the operations of the off-board control system. The off-board control system can include or be connected with a communication device 208 that may communicate with the target preservation system and/or the vehicle.

The off-board control system in various embodiments can be, include, or be a part of a back-office server of a positive control system. Alternatively, the off-board control system can be another system that monitors movements of the vehicles to ensure safe travel of the vehicles. For example, the off-board control system can be configured as, form a part of, or be associated with a dispatch facility, a scheduling facility, or the like. The off-board control system can include a tangible and non-transitory computer-readable storage medium (e.g., a memory 210) that stores, for example, enforcement targets located within a territory associated with or administered by the off-board control system.

In one example, the memory may store historical data, for example, the memory may store information related to the state of the communication along the route. Said another way, the memory may store information indicating where an active state or a degraded state may be along the route based on previous trips along the route. The historical data may be related to portions of the route associated with a degraded state. The off-board control system may communicate to the vehicle, for example the target preservation system, the portions of the route associated with the degraded state. The target preservation system may then be able to store enforcement targets or enforcement activities in anticipation of the portion of the route associated with the degraded state.

In one example, an AI neural network may examine the historical data. The AI neural network may include artificial neurons arranged in layers and connected with each other by connections. The AI neural network may perform calibration for the vehicle to account for differences in components of the vehicle, locations along the route, external conditions (e.g., weather conditions), or the like. The AI neural network may calculate an anticipated portion of the route where communication may be in a degraded state or an active state based on the inputs obtained and evaluated. The AI neural network may receive feedback regarding the active state or the degraded state that may be calculated by the artificial neurons. The AI neural network may be trained by changing one or more connections between the artificial neurons in the AI neural network based on the feedback, as discussed further below.

Figure 3:
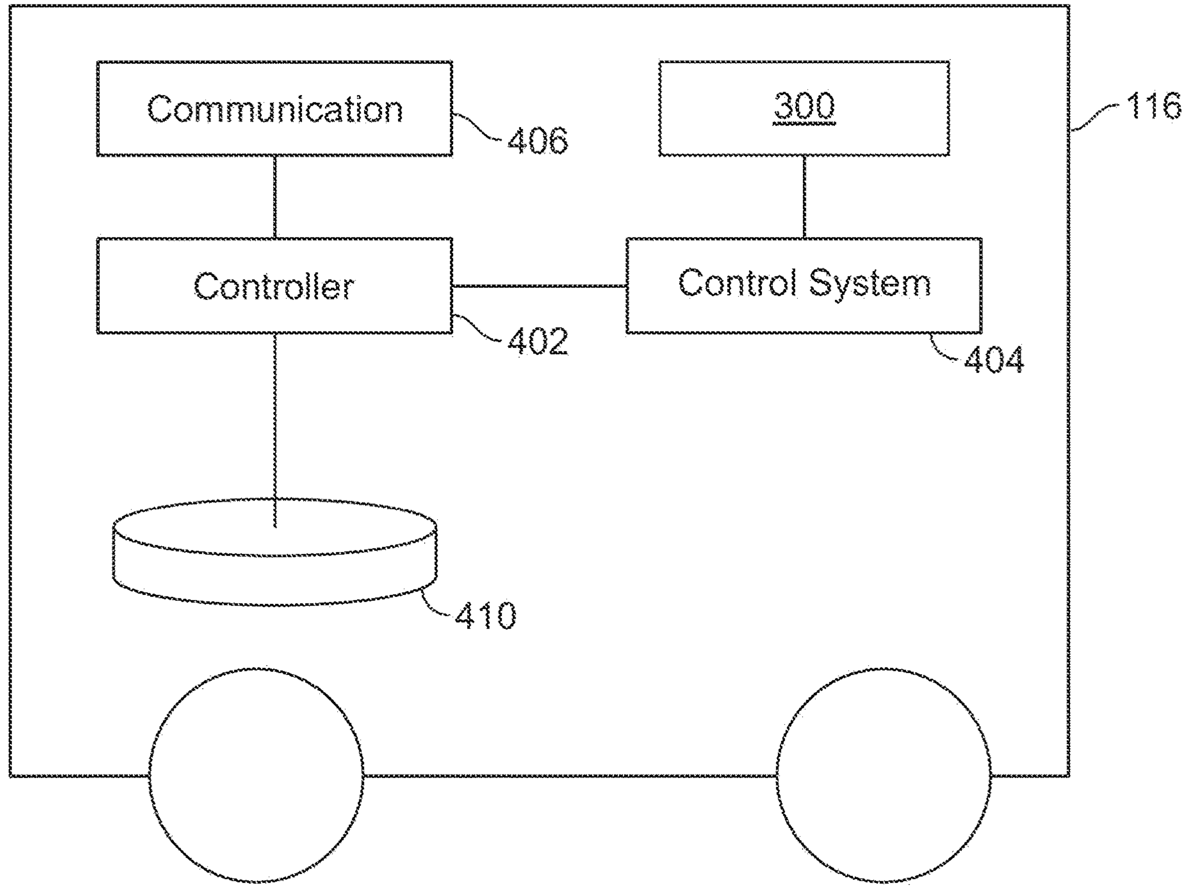
FIG. 3 provides a schematic block diagram of aspects of the network of FIG. 1 disposed on a vehicle.

The depicted processing unit may be disposed on-board the vehicle in various embodiments (see, e.g., FIG. 3 and related discussion). It may be noted that, for ease and clarity of illustration, in the depicted example, processing unit may be shown as a single unit; however, in various embodiments the processing unit may be distributed among or include more than one physical unit, and may be understood as representing one or more processors. The processing unit may represent hardware circuitry that includes and/or is connected with one or more processors (e.g., one or more microprocessors, integrated circuits, microcontrollers, field programmable gate arrays, etc.) that perform operations described herein. The processing unit in various embodiments stores acquired information in a tangible and non-transitory computer-readable storage medium (e.g., memory 312). Additionally or alternatively, instructions for causing the processing unit to perform one or more tasks discussed herein may be stored in a tangible and non-transitory computer-readable storage medium (e.g., memory in FIG. 2).

When the vehicle may be in the active state and can receive instructions for the off-board system, the processing unit may receive enforcement targets from the off-board system (e.g., via communication unit 320). As discussed herein, the enforcement targets may be associated with corresponding portions of a route to be traversed by the vehicle, and have corresponding associated enforcement activities to be performed based on location (e.g., proximity) of the vehicle relative to the corresponding portions of the route. For example, an enforcement activity may be performed when the vehicle is within a threshold distance or arrival time of an associated portion of the route, or as another example, when the vehicle enters the associated portion of the route. Further, enforcement activities may have increasing levels of intervention that are implemented based on, for example, proximity to the corresponding portion of the route. For example, within a first threshold an instruction message may be displayed to an operator to implement an enforcement target (e.g., speed limit). If the vehicle subsequently enters within a second, shorter threshold of the portion, the enforcement target may be implemented autonomously.

The processing unit may store at least some of the received enforcement targets onboard the vehicle as preserved targets having corresponding preserved enforcement activities. The preserved targets and associated preserved enforcement activities may be stored, for example, in the memory. The preserved targets and associated preserved enforcement activities in the illustrated example may be saved responsive to a transition from the active state to the degraded state of the vehicle. It may be noted that enforcement targets may be stored for a predetermined amount of time in a buffer, and then transferred from the buffer to a more permanent storage location responsive to a switch from the active to degraded state. Accordingly, transferring buffered enforcement targets to a more permanent or non-time-dependent storage location may be understood as saving enforcement targets as preserved targets in various examples. In one example, all received enforcement targets may be saved in a buffer. Then, responsive to a change to the degraded state, the enforcement targets which may still be pending or have enforcement activities that have not been implemented and/or completed may be saved as preserved targets.

In one example, the enforcement targets may be transferred to the more permanent storage location based on one or more characteristics. For example, the enforcement targets may be transferred to the more permanent storage location based on the level of intervention of the enforcement activity. An enforcement activity with a greater level of intervention may be automatically transferred to the more permanent storage location, such that the enforcement target may always be accessible regardless of the state of communication. In another example, the enforcement targets may be transferred to the more permanent storage responsive to other characteristics, for example, population density around a given portion of the route is above a predetermined amount, grade of the route, where the speed limit changes by a predetermined amount, a number of vehicles on the route being greater than a predetermined number, or the like. This may facilitate safety and continuity of travel by the vehicle along the route.

Further, the depicted processing unit may perform the preserved enforcement activities associated with the preserved targets. For example, as the vehicle approaches specific portions of the route associated with the preserved targets, the appropriate preserved enforcement activities may be performed. As one example, the enforcement activity may include displaying an instruction or other message to an operator. As another example, performing the enforcement activity may include autonomously operating the vehicle. For instance, in an example, if a command to slow the vehicle to comply with a speed limit has not been satisfactorily implemented by the operator, the processing unit may provide a control signal to the vehicle to autonomously (e.g., without operator involvement) slow the vehicle to comply with the speed limit. Accordingly, in various embodiments, enforcement activities may still be performed even though the vehicle is in the degraded state, in contrast to conventional approaches for which the enforcement activities are lost and not performed in the degraded state. Accordingly, various embodiments improve the functioning and operation of processors (e.g., processing unit) by changing the operation of the processors (e.g., by saving information responsive to a switch from the active state to the degraded state).

Alternatively or additionally to performing the enforcement activities, in various embodiments, the processing unit may provide a prompt to the off-board control system (or other off-board source of instructions) responsive to the transition from the active state to the degraded state. For example, the prompt may alert the off-board control system of the transition. In one example, the processing unit may provide a prompt to the off-board control system in anticipation of the transition from the active state to the degraded state. The off-board control system may communicate with the processing unit to determine a transition, or anticipated transition, from the active state to the degraded state. Additionally or alternatively, the prompt may inform the off-board control system of which enforcement targets and activities have been preserved. Updated prompts as the preserved activities are implemented may also be sent to the off-board control system. Accordingly, the off-board control system may monitor performance of enforcement targets and/or determine which enforcement targets have not been preserved, and act appropriately. For example, if it is determined that upcoming enforcement targets within a predetermined threshold time or distance have not been received and preserved by the vehicle, the off-board control system may take steps to instruct the vehicle to slow or stop and/or to instruct other vehicles in the vicinity (and/or one or more scheduling or dispatch centers) that the vehicle is not receiving enforcement targets.

It may be noted that, in some examples, the preserved targets include at least one enforcement target for which corresponding enforcement activities have not yet been implemented at the time of the transition to the degraded state. For example, the enforcement target (or targets) may relate to portions of the route that the vehicle has not yet encountered. In this way, enforcement targets that have been received but not yet implemented, may be implemented despite a transition to a degraded state.

Alternatively or additionally, the preserved targets may include at least one enforcement target for which corresponding enforcement activities have not yet been completed at the time of the transition to the degraded state. For example, the vehicle may enter a portion of the route having an enforcement target and begin performance of an enforcement activity of an enforcement target for that portion, such as displaying a speed limit and/or autonomously controlling the vehicle to comply with the speed limit. While still in the portion of the route and while the enforcement activity is being performed, the vehicle may transition to the degraded state. With the enforcement activity saved, the processing unit can continue performing the enforcement activity. In this way, for enforcement targets that have been received and for which enforcement activities have begun but not finished, the enforcement activities may be completed despite a transition to a degraded state.

The depicted target preservation system also may include a display 330. The display, for example, may include a screen configured to display prompts or messages to an operator of the vehicle. The display, for example, may display instructions called for by enforcement targets, such as speed limits. In some embodiments, performing an enforcement activity may include providing a prompt to an operator or the vehicle, for example to instruct an operator to follow a speed limit for a given portion of the route. Alternatively or additionally, the processing unit may provide a prompt to an operator of the vehicle (e.g., via display) responsive to the transition from the active state to the degraded state. For example, the prompt may alert the operator of the transition. As another example, the prompt may list one or more enforcement targets and/or associated enforcement activities that have been preserved. The prompt may be configured to be interactive, with the operator acknowledging receipt of the prompt and/or acknowledging individual enforcement targets and associated enforcement activities. In some examples, the display is color coded. For instance, higher priority or more urgent prompts may be displayed in red while other prompts are displayed in yellow and/or other colors.

The depicted target preservation system also may include a communication device. Generally, the communication device may include one or more components (e.g., receiver, transceiver) that may communicate or obtain information from off-board sources such as the off-board control system or wayside device. It may be noted that the communication device is shown as a single distinct block for ease of illustration. However, in various embodiments the communication device may work with or form a part of aspects of the target preservation system (or be formed from one or more aspects of target preservation system) and/or the vehicle. In various embodiments, the communication device receives enforcement targets from the off-board control system and provides them to the processing unit. Further, in some embodiments, the target preservation system may communicate with one or more off-board systems (e.g., office systems) to inform appropriate off-board systems when the vehicle transitions to a degraded state. In another example, the off-board system may communicate with the preservation system to inform the appropriate on-board systems when the vehicle transitions, or is anticipated to transition, to a degraded state. Further, the communication device may also be utilized to communicate with the vehicle (e.g., in embodiments where the target preservation system or aspects thereof are disposed off-board the vehicle). For example, the target preservation system may send control signals as discussed herein to the vehicle via the communication unit.

It may be noted that, in various embodiments, the target preservation system (or aspects thereof) is configured to be disposed on the vehicle. FIG. 3 illustrates an example embodiment in which the target preservation system is disposed on the vehicle.

As seen in FIG. 3, the vehicle includes a controller 402 that may represent one or more processors that control movement and other operations of the vehicle. This controller can be referred to as a vehicle controller. The vehicle controller can represent an engine control unit, an onboard navigation system, or the like, which can control a propulsion system (e.g., one or more engines, motors, etc.) and/or a braking system (e.g., one or more friction brakes, air brakes, regenerative brakes, etc.) to control movement of the vehicle.

The vehicle optionally includes a control system 404 that communicates with the target preservation system for receiving control signals. In some examples the control system can autonomously initiate enforcement activities via the controller based on instructions received from the target preservation system (e.g., an instruction to perform an enforcement activity such as slowing or stopping the vehicle). The control signals can be received by the vehicle controller and/or vehicle control system via a communication device 406. This communication device (as well as other communication units discussed herein) can include an antenna and wireless transceiving circuitry that wirelessly communicates signals with other communication devices described herein. It may be noted that in some examples the communication device may be integrated into or associated with the communication unit of a target preservation system disposed onboard the vehicle. A tangible and non-transitory computer-readable storage medium (e.g., a memory 410) of the vehicle may store acquired information and/or instructions for causing performance of one or more tasks by the controller. It may be noted that one or more aspects of the vehicle and the target preservation system may be shared, such as communication devices for communicating with the off-board control system.

Figure 4:
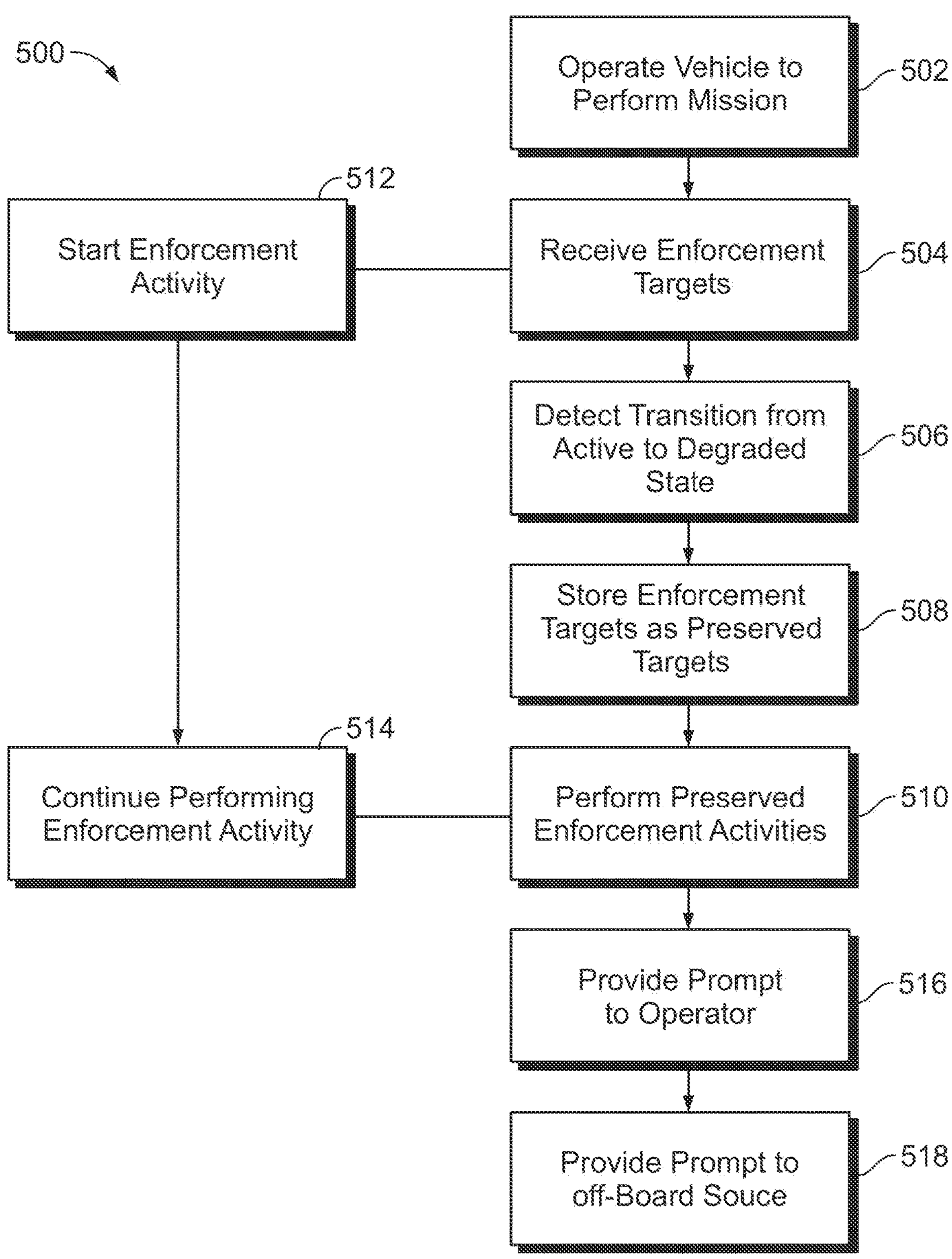
FIG. 4 illustrates a flowchart of one example of a method for controlling a vehicle traversing a route that receives instructions from an off-board source.

FIG. 4 illustrates a flowchart of one example of a method 500 for controlling a vehicle traversing a route having one or more phase breaks. The method, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method may be able to be used as one or more algorithms to direct hardware (e.g., one or more aspects of the processing unit) to perform one or more operations described herein.

At 502, a vehicle (e.g., vehicle) may be operated to perform a mission along a route. In the illustrated example, the vehicle may receive enforcement targets from an off-board source.

At 504, with the vehicle in an active state in which the vehicle receives instructions from the off-board system, the vehicle and/or an associated system (e.g., a target preservation system disposed on-board the vehicle) may receive enforcement targets from an off-board source. The enforcement targets are associated with corresponding portions of a route to be traversed by the vehicle. For example, there may be one or more enforcement targets associated with a first portion of a route, one or more enforcement targets with a second portion of a route, and so on. The enforcement targets have corresponding associated enforcement activities to be performed based on location of the vehicle relative to the corresponding portion of the route as discussed herein. For example, an enforcement activity may include displaying a message to an operator as the vehicle approaches near or enters a portion of the route having a speed limit. As another example, an enforcement activity may include autonomously slowing a vehicle to meet a speed limit for a portion of the route as the vehicle approaches near or enters that portion.

At 506, a transition of the vehicle from an active state to a degraded state may be detected (e.g., by target preservation system). For example, the system may detect a failure of a communication device or a GPS device, or, as another example, the target preservation system may receive an input from a crew member indicating that the crew has transitioned the vehicle into the degraded state. In the degraded state, the enforcement targets may no longer be received.

At 508, responsive to the transition from the active to the degraded state, at least some of the enforcement targets may be stored onboard as preserved targets. The preserved targets may have corresponding preserved enforcement activities.

At 510, the preserved enforcement activities associated with the preserved targets may be performed. For example, as the vehicle progresses along the route, the enforcement activities may be performed as appropriate based on the portions of the route that the vehicle passes through. It may be noted that enforcement activities may include, as one example, providing a prompt on-board the vehicle to an operator of the vehicle, or as another example, performing the preserved enforcement activities includes autonomously operating a vehicle.

In some examples, the preserved targets may include enforcement targets for which corresponding enforcement activities have not been started at the time of the transition to the degraded state. Additionally or alternatively, in some examples, the preserved targets may include enforcement targets for which corresponding enforcement activities have been started but not yet completed at the time of the transition to the degraded state. For example, in the illustrated embodiment, at 512, an enforcement activity is started before the transition to the degraded state, and at 514, the enforcement activity that has been started but not completed before the transition is continued to be performed.

At 516, a prompt may be provided to an operator of the vehicle responsive to the transition from the active state to the degraded state. At 518 of the illustrated example, a prompt may be provided to the off-board source responsive to the transition from the active state to the degraded state. Accordingly, in various embodiments, an operator of the vehicle and/or an off-board system may be alerted to the transition of the vehicle to the degraded state and take appropriate steps.

Figure 5:
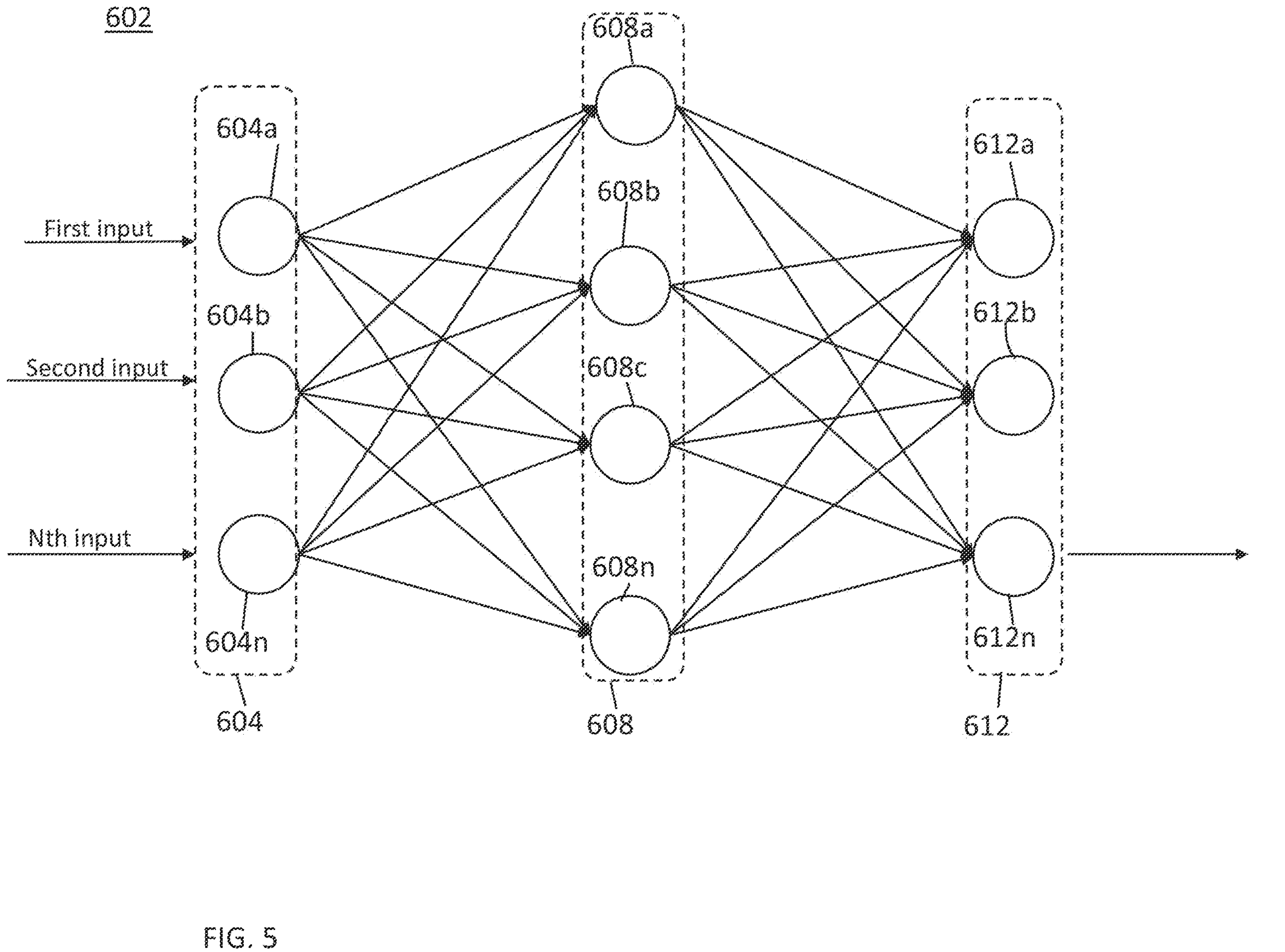
FIG. 5 illustrates a functional block diagram of an example neural network that can be used by a vehicle speed management system, according to one example.

As previously stated, one or more of the vehicle control systems described herein may be implemented in an AI or machine-learning system. FIG. 5 illustrates a functional block diagram of an example neural network 602 that can be used by a target preservation system, according to one example. The target preservation system may review various inputs, described above, for example the current active or degraded state of the vehicle, historical active or degraded state of the vehicle, speed limit changes along the route, grade changes along the route, number of vehicles along the route, population density along the route, or the like. In one example, the neural network can represent a long short-term memory (LSTM) neural network. In one example, the neural network can represent one or more recurrent neural networks (RNN). The neural network may be used to implement the machine learning as described herein, and various implementations may use other types of machine learning networks. The neural network may include an input layer 604, one or more intermediate or hidden layers 608, and an output layer 612. Each layer includes artificial individual units, or neurons. Each neuron can receive information (e.g., as input into the neural network or as received as output from another neuron in another layer or the same layer), process this information to generate output, and provide the output to another neuron or as output of the neural network. The input layer may include several input neurons 604*a*, 604*b* . . . 604*n*. The hidden layer may include several intermediate neurons 608*a*, 608*b* . . . 608*n*. The output layer may include several output neurons outputs 612*a*, 612*b* . . . 612*n*. The inputs may include, for example, the active or degraded state of the vehicle, speed limit changes along the route, grade changes along the route, number of vehicles along the route, population density along the route, or the like.

Each neuron can receive an input from another neuron and output a value to the corresponding output to another neuron (e.g., in the output layer or another layer). For example, the intermediate neuron 608*a* can receive an input from the input neuron 604*a* and output a value to the output neuron 612*a*. Each neuron may receive an output of a previous neuron as an input. For example, the intermediate neuron 608*b* may receive input from the input neuron 604*b* and the output neuron 612*a*. The outputs of the neurons may be fed forward to another neuron in the same or different intermediate layer.

The processing performed by the neurons may vary based on the neuron, but can include the application of the various rules or criteria described herein to partially or entirely decide one or more aspects of the target preservation system, for example when to preserve enforcement activities, quantity of enforcement activities to preserve, when to perform enforcement activities, or the like. The output of the application of the rule or criteria can be passed to another neuron as input to that neuron. One or more neurons in the intermediate and/or output layers can determine connections between one or more aspects of the target preservation system, for example when and where along the route to preserve enforcement activities. As used herein, a "connection" may refer to a preferred operation of the target preservation system based on the inputs, for example a preferred preservation and performance of enforcement activities given the inputs. The preferred operation may be based on increasing performance, efficiency, safety, longevity, or a combination of any or all of these factors. The last output neuron 612*n* in the output layer may output a connection or no-connection decision. For example, the output from the neural network may be that a given number of enforcement targets and enforcement activities need to be preserved as a result of a given degraded status (or anticipated degraded status) of the vehicle, for example. Although the input layer, the intermediate layer(s), and the output layer may be depicted as each including three artificial neurons, one or more of these layers may contain more or fewer artificial neurons. The neurons can include or apply one or more adjustable parameters, weights, rules, criteria, or the like, as described herein, to perform the processing by that neuron.

In various implementations, the layers of the neural network may include the same number of artificial neurons as each of the other layers of the neural network. For example, the active or degraded state of the vehicle, the speed limit along the route, the grade along the route, or the like may be processed to provide information to the input neurons 604*a*-604*n*. The output of the neural network may represent a connection or no-connection of the inputs to the a given output. More specifically, the inputs can include current and historical vehicle data. The current and historical data can be provided to the neurons 608*a*-608*n* for analysis and matches between the current vehicle data and the historical vehicle data. The neurons 608*a*-608*n*, upon finding connections, may provide the potential connections as outputs to the output layer, which can determine a connection, no connection, or a probability of a connection.

In some embodiments, the neural network may be a convolutional neural network. The convolutional neural network can include an input layer, one or more hidden or intermediate layers, and an output layer. In a convolutional neural network, however, the output layer may include one fewer output neuron than the number of neurons in the intermediate layer(s), and each neuron may be connected to each output neuron. Additionally, each input neuron in the input layer may be connected to each neuron in the hidden or intermediate layer(s).

Such a neural network-based vehicle speed management system can be trained by operators, automatically self-trained by the vehicle speed management system itself, or can be trained both by operators and by the vehicle speed management system itself to improve how the system operates.

In one embodiment, a system may include one or more processors disposed onboard a vehicle. When in an active state of the vehicle in which the system may receive instructions from an off-board system, the processors may receive enforcement targets from an off-board source. The enforcement targets may be associated with corresponding portions of a route and may have corresponding associated enforcement activities to be performed based on location of the vehicle relative to the corresponding portions of the route. The processors may store at least some of the received enforcement targets onboard the vehicle as preserved targets having corresponding preserved enforcement activities responsive to a transition from the active state to a degraded state of the vehicle in which two or more enforcement targets are no longer received. The processors may perform the preserved enforcement activities associated with the preserved targets.

In one example, the preserved targets may include at least one enforcement target for which corresponding enforcement activities have not yet been implemented at the time of the transition to the degraded state. The preserved targets may be stored on a memory responsive to the transition from the active state to the degraded state. The preserved enforcement activities may include providing a prompt to an operator of the vehicle onboard the vehicle.

In one example, the off-board source of the vehicle may include an off-board memory. The off-board memory may store historical information related to portions of the route associated with the degraded state. The off-board source of the vehicle may communicate to the one or more processors the portions of the route associated with the degraded state. The one or more processors may store at least some of the received enforcement targets onboard the vehicle as preserved targets having corresponding preserved enforcement activities responsive to receiving the portions of the route associated with the degraded state from the off-board source of the vehicle.

In one embodiment, a system may include one or more processors disposed onboard a vehicle. The one or more processors may receive, while in an active state of the vehicle in which the system receives instructions from an off-board system, enforcement targets from an off-board source. The enforcement targets may be associated with corresponding portions of a route to be traversed by the vehicle and may have corresponding associated enforcement activities to be performed based on location of the vehicle relative to the corresponding portions of the route. The processors may store at least some of the received enforcement targets onboard the vehicle as preserved targets having corresponding preserved enforcement activities responsive to a transition from the active state to a degraded state of the vehicle in which two or more enforcement targets are no longer received. The preserved enforcement activities may include one or more of slowing movement of the vehicle to comply with a speed limit of the route, informing the off-board source of which of the received enforcement targets were stored as the preserved enforcement activities, or continuing performance of a current enforcement target of the received enforcement target that was being performed as the vehicle transitioned from the active state to the degraded state. The processors may provide a prompt to the off-board source responsive to the transition from the active state to the degraded state.

In one example, the processors may perform the preserved enforcement activities associated with the preserved targets. The preserved targets may be stored on a memory responsive to the transition from the active state to the degraded state.

In one example, the off-board source of the vehicle may include an off-board memory. The off-board memory may store historical information related to portions of the route associated with the degraded state. The off-board source of the vehicle may communicate to the one or more processors the portions of the route associated with the degraded state. The one or more processors may store at least some of the received enforcement targets onboard the vehicle as preserved targets having corresponding preserved enforcement activities responsive to receiving the portions of the route associated with the degraded state from the off-board source of the vehicle.

The processors may provide a prompt to an operator of the vehicle responsive to the transition from the active state to the degraded state.

In one embodiment, a method may include receiving, while in an active state of the vehicle in which the system receives instructions from an off-board system, enforcement targets from an off-board source. The enforcement targets may be associated with corresponding portions of a route to be traversed by the vehicle and may have corresponding associated enforcement activities to be performed based on location of the vehicle relative to the corresponding portions of the route. The method may also include storing at least some of the received enforcement targets onboard the vehicle as preserved targets having corresponding preserved enforcement activities responsive to a transition from the active state to a degraded state of the vehicle in which two or more enforcement targets are no longer received. Further, the method may include performing the preserved enforcement activities associated with the preserved targets.

In one example, the preserved targets may include enforcement targets for which corresponding enforcement activities have not yet been implemented at the time of the transition to the degraded state. The method may include storing the preserved targets on a memory responsive to the transition from the active state to the degraded state.

In one example, the method may include storing historical information on an off-board memory of the off-board vehicle source of the vehicle, the historical information related to portions of the route associated with the degraded state. The method may include the off-board source communicating the portions of the route associated with the degraded state to the vehicle. The method may include storing at least some of the received enforcement targets onboard the vehicle as preserved targets having corresponding enforcement activities responsive to receiving the portions of the route associated with the degraded state from the off-board source of the vehicle.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such clauses are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:

one or more processors configured to be disposed onboard a vehicle and to:

receive, while in an active state of the vehicle in which the system receives instructions from an off-board source, enforcement targets from the off-board source, the enforcement targets associated with corresponding portions of a route to be traversed by the vehicle, the enforcement targets having corresponding associated enforcement activities to be performed based on a location of the vehicle relative to the corresponding portions of the route;

responsive to a transition from the active state to a degraded state of the vehicle, store at least some of the received enforcement targets onboard the vehicle as preserved targets having corresponding preserved enforcement activities wherein the degraded state of the vehicle comprises a state in which two or more enforcement targets are no longer received; and perform the preserved enforcement activities associated with the preserved targets.

2. The system of claim 1, wherein the preserved targets comprise at least one enforcement target for which corresponding enforcement activities have not yet been implemented at a time of the transition to the degraded state.

3. The system of claim 1, wherein the preserved targets are stored on a memory responsive to the transition from the active state to the degraded state.

4. The system of claim 1, wherein performing the preserved enforcement activities comprises providing a prompt to an operator of the vehicle onboard the vehicle.

5. The system of claim 1, wherein the off-board source of the vehicle includes an off-board memory, the off-board memory configured to store historical information related to portions of the route associated with the degraded state.

6. The system of claim 5, wherein the off-board source of the vehicle is configured to communicate to the one or more processors the portions of the route associated with the degraded state.

7. The system of claim 6, wherein the one or more processors are configured to store at least some of the received enforcement targets onboard the vehicle as preserved targets having corresponding preserved enforcement activities responsive to receiving the portions of the route associated with the degraded state from the off-board source of the vehicle.

8. A system comprising:

one or more processors configured to be disposed onboard a vehicle and to:

receive, while in an active state of the vehicle in which the system receives instructions from an off-board source, enforcement targets from the off-board source, the enforcement targets associated with corresponding portions of a route to be traversed by the vehicle, the enforcement targets having corresponding associated enforcement activities to be performed based on location of the vehicle relative to the corresponding portions of the route; and store at least some of the received enforcement targets onboard the vehicle as preserved targets having corresponding preserved enforcement activities responsive to a transition from the active state to a degraded state of the vehicle in which two or more enforcement targets are no longer received;

wherein the preserved enforcement activities comprise continuing performance of a current enforcement target of the received enforcement target that was being performed as the vehicle transitioned from the active state to the degraded state, wherein the one or more processors are configured to provide a prompt to the off-board source responsive to the transition from the active state to the degraded state, and wherein the preserved targets are stored on a memory responsive to the transition from the active state to the degraded state.

9. The system of claim 8, wherein the one or more processors are configured to perform the preserved enforcement activities associated with the preserved targets.

10. The system of claim 8, wherein the off-board source of the vehicle includes an off-board memory, the off-board memory configured to store historical information related to portions of the route associated with the degraded state.

11. The system of claim 10, wherein the off-board source of the vehicle is configured to communicate to the one or more processors the portions of the route associated with the degraded state.

12. The system of claim 11, wherein the one or more processors are configured to store at least some of the received enforcement targets onboard the vehicle as preserved targets having corresponding preserved enforcement activities responsive to receiving the portions of the route associated with the degraded state from the off-board source of the vehicle.

13. The system of claim 8, wherein the one or more processors are configured to provide a prompt to an operator of the vehicle responsive to the transition from the active state to the degraded state.

14. A method comprising:

receiving, while in an active state of a vehicle in which the vehicle receives instructions from an off-board source, enforcement targets from the off-board source, the enforcement targets associated with corresponding portions of a route to be traversed by the vehicle, the enforcement targets having corresponding associated enforcement activities to be performed based on location of the vehicle relative to the corresponding portions of the route;

responsive to a transition from the active state to a degraded state of the vehicle, storing at least some of the received enforcement targets onboard the vehicle as preserved targets having corresponding preserved enforcement activities wherein the degraded state of the vehicle comprises a state in which two or more enforcement targets are no longer received; and performing the preserved enforcement activities associated with the preserved targets.

15. The method of claim 14, wherein the preserved targets comprise enforcement targets for which corresponding enforcement activities have not yet been implemented at a time of the transition to the degraded state.

16. The method of claim 14, further comprising storing the preserved targets on a memory responsive to the transition from the active state to the degraded state.

17. The method of claim 14, further comprising storing historical information on an off-board memory of the off-board source, the historical information related to portions of the route associated with the degraded state.

18. The method of claim 17, further comprising the off-board source communicating the portions of the route associated with the degraded state to the vehicle.

19. The method of claim 18, further comprising storing at least some of the received enforcement targets onboard the vehicle as preserved targets having corresponding enforcement activities responsive to receiving the portions of the route associated with the degraded state from the off-board source of the vehicle.

* * * * *